(12) United States Patent
Huang et al.

(10) Patent No.: US 11,663,299 B2
(45) Date of Patent: May 30, 2023

(54) METHOD AND APPARATUS FOR PREVENTING ROLLBACK OF FIRMWARE OF DATA PROCESSING DEVICE, AND DATA PROCESSING DEVICE

(71) Applicant: SHENZHEN MICROBT ELECTRONICS TECHNOLOGY CO., LTD., Shenzhen (CN)

(72) Inventors: Lihong Huang, Shenzhen (CN); Jianli Wei, Shenzhen (CN); Weibin Ma, Shenzhen (CN); Zhiming Fu, Shenzhen (CN)

(73) Assignee: SHENZHEN MICROBT ELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/762,671

(22) PCT Filed: Jul. 7, 2021

(86) PCT No.: PCT/CN2021/104888
§ 371 (c)(1),
(2) Date: Mar. 22, 2022

(87) PCT Pub. No.: WO2022/022247
PCT Pub. Date: Feb. 3, 2022

(65) Prior Publication Data
US 2022/0414189 A1 Dec. 29, 2022

(30) Foreign Application Priority Data
Jul. 31, 2020 (CN) .......................... 202010759336.1

(51) Int. Cl.
*G06F 21/12* (2013.01)
*G06F 8/65* (2018.01)
*H04L 41/082* (2022.01)

(52) U.S. Cl.
CPC .............. *G06F 21/121* (2013.01); *G06F 8/65* (2013.01); *H04L 41/082* (2013.01)

(58) Field of Classification Search
CPC ...... G06F 21/57; G06F 21/575; G06F 21/572; G06F 21/12
See application file for complete search history.

(56) References Cited

U.S. PATENT DOCUMENTS

| 7,181,610 B2 * | 2/2007 | Zimmer | G06F 9/4411 713/1 |
| 2004/0025036 A1 * | 2/2004 | Balard | H04L 9/0822 713/176 |

(Continued)

FOREIGN PATENT DOCUMENTS

| CN | 101004691 A | 7/2007 |
| CN | 106528123 A | 3/2017 |

(Continued)

OTHER PUBLICATIONS

International Search Report and Written Opinion for Application No. PCT/CN2021/104888, dated Sep. 28, 2021.

(Continued)

*Primary Examiner* — Dao Q Ho
(74) *Attorney, Agent, or Firm* — Marshall, Gerstein & Borun LLP

(57) ABSTRACT

Implementations of the present application propose a method and apparatus for preventing rollback of firmware of a data processing device, and a data processing device. The method includes: enabling a boot loader (BootLoader) to read a current value of a predetermined bit in a one-time programmable memory (eFuse); determining whether the current value and a legal value written into the one-time programmable memory after the latest updating of the firmware of the data processing device satisfy a preset relationship; in response to determining that the current (Continued)

value and the legal value satisfy the preset relationship, enabling the boot loader to call an operating system kernel of the data processing device, and in response to determining that the current value and the legal value do not satisfy the preset relationship, enabling the boot loader not to call the operating system kernel of the data processing device. According to the implementations of the present application, rollback of the firmware can be prevented based on a variety of ways in a link-by-link mode.

12 Claims, 3 Drawing Sheets

(56) References Cited

U.S. PATENT DOCUMENTS

| | | | | |
|---|---|---|---|---|
| 2007/0162964 | A1* | 7/2007 | Wang | G06F 21/77 |
| | | | | 726/5 |
| 2008/0104386 | A1* | 5/2008 | Van Rooyen | G06F 9/4401 |
| | | | | 713/2 |
| 2009/0024784 | A1* | 1/2009 | Wang | G06F 21/572 |
| | | | | 711/E12.001 |
| 2014/0180665 | A1* | 6/2014 | Naydon | G06F 9/455 |
| | | | | 703/25 |
| 2019/0087581 | A1* | 3/2019 | Kim | G06F 8/65 |
| 2019/0147165 | A1* | 5/2019 | Chen | H04L 9/0643 |
| | | | | 726/22 |
| 2020/0243154 | A1* | 7/2020 | Sity | G06F 11/1068 |
| 2021/0042035 | A1* | 2/2021 | Futagi | G06F 11/1469 |

FOREIGN PATENT DOCUMENTS

| | | |
|---|---|---|
| CN | 108595198 A | 9/2018 |
| CN | 108681520 A | 10/2018 |
| CN | 109508535 A | 3/2019 |
| CN | 111221553 A | 6/2020 |
| CN | 111966970 A | 11/2020 |
| WO | WO-2015183355 A2 | 12/2015 |

OTHER PUBLICATIONS

Office Action in corresponding Chinese Application No. 202010759336.1, dated Jan. 18, 2021.

* cited by examiner

METHOD AND APPARATUS FOR PREVENTING ROLLBACK OF FIRMWARE OF DATA PROCESSING DEVICE, AND DATA PROCESSING DEVICE

The present application claims priority to Chinese Patent Application No. 202010759336.1 filed on Jul. 31, 2020 and titled "Method and Apparatus for Preventing Rollback of Firmware of Digital Currency Mining Machine, and Digital Currency Mining Machine", the contents of which are incorporated herein by reference.

TECHNICAL FIELD

The present application belongs to the technical field of digital currencies, and in particular relates to a method and apparatus for preventing rollback of firmware of a data processing device, and a data processing device.

BACKGROUND ART

Digital currencies can be considered as virtual currencies based on node networks and digital encryption algorithms. The digital currencies usually include the following characteristics: 1, because the digital currencies come from some open algorithms, there is no issuer of the digital currencies; 2, because the number of algorithm solutions is determined, the total amount of the digital currencies is fixed; and 3, because a transaction process requires the approval of each node in a network, the transaction process of the digital currencies is sufficiently safe. With the rapid development of supercomputers, data processing devices for the digital currencies, such as digital currency mining machines, have been gradually developed from graphics card mining machines to application specific integrated circuit (ASIC) mining machines with lower power consumption and lower cost. At present, the digital currency mining machines generally run firmware customized by manufacturers to realized functions such as connecting to mining pools, running mining programs, and providing mine operation and maintenance interfaces.

The upgraded system firmware usually has better security. However, at present, there are malicious behaviors of rolling back to cracked old versions of firmware and installing bad programs. How to prevent rollback of firmware of a digital currency mining machine is a major technical problem.

SUMMARY OF THE INVENTION

Embodiments of the present application propose a method and apparatus for preventing rollback of firmware of a data processing device, and a data processing device.

A method for preventing rollback of firmware of a data processing device, including:
enabling a boot loader to read a current value of a predetermined bit in a one-time programmable memory;
determining whether the current value and a legal value written into the one-time programmable memory after the latest upgrading of the firmware of the data processing device satisfy a preset relationship; and
in response to determining that the current value and the legal value satisfy the preset relationship, enabling the boot loader to call an operating system kernel of the data processing device, and in response to determining that the current value and the legal value do not satisfy the preset relationship, enabling the boot loader not to call the operating system kernel of the data processing device.

In an implementation, the calling, by the boot loader, the operating system kernel of the data processing device includes: transmitting, by the boot loader, illegal startup parameters to the operating system kernel of the data processing device, and the method further includes:
correcting the illegal startup parameters to legal startup parameters based on a predetermined correction mode; and
starting up the operating system kernel of the data processing device based on the legal startup parameters.

In an implementation, after the starting up the operating system kernel of the data processing device, the method further includes:
enabling the operating system kernel of the data processing device to detect a predetermined file in a file system; and
in response to the operating system kernel of the data processing device detects the predetermined file in the file system, enabling the operating system kernel of the data processing device to load the file system; and in response to the operating system kernel of the data processing device does not detect the predetermined file in the file system, enabling the operating system kernel of the data processing device not to load the file system.

In an implementation, the detecting, by the operating system kernel of the data processing device, the predetermined file in the file system includes:
detecting, by a virus scanning engine thread deployed in the operating system kernel of the data processing device, a virus database deployed in the file system.

In an implementation, the method further includes:
enabling the virus scanning engine thread to scan the data processing device by using the virus database to obtain a scanning result; and
enabling the virus scanning engine thread to perform predetermined processing corresponding to the scanning result, wherein the predetermined processing includes at least one of the following:
giving an alarm in response to determining that the data processing device is abnormal based on the scanning result;
prohibiting the running of a data processing program in response to determining that the data processing device is abnormal based on the scanning result;
deleting a virus in response to determining that the data processing device has the virus based on the scanning result;
stopping the running of the virus in response to determining that the data processing device has a virus based on the scanning result; and
prohibiting the running of the data processing program in response to the scanning result indicates that the data processing device has a virus.

In an implementation, upon detecting the virus database deployed in the file system, the method further includes:
enabling the virus scanning engine thread to verify the virus database; and in response to the virus database is found to be tampered with, enabling the virus scanning engine thread to prohibit the running of a data processing program.

In an implementation, the legal value written into the one-time programmable memory after the latest upgrading of the firmware of the data processing device is written into the one-time programmable memory in response to the first starting up of the boot loader after the latest upgrading of the firmware of the data processing device; and the method further includes: after the legal value is written into the one-time programmable memory, updating a value of the predetermined bit according to the legal value and the preset relationship.

An apparatus for preventing rollback of firmware of a data processing device, including:

a reading module, configured to enable a boot loader to read a current value of a predetermined bit in a one-time programmable memory;

a determining module, configured to determine whether the current value and a legal value written into the one-time programmable memory after the latest upgrading of the firmware of the data processing device satisfy a preset relationship; and a processing module, configured to enable the boot loader to call an operating system kernel of the data processing device in response to it is determined that the current value and the legal value satisfy the preset relationship, and enable the boot loader not to call the operating system kernel of the data processing device in response to it is determined that the current value and the legal value do not satisfy the preset relationship.

In an implementation, the processing module is configured to enable the boot loader to transmit illegal startup parameters to the operating system kernel of the data processing device; and the apparatus further includes:

a kernel startup module, configured to correct the illegal startup parameters to legal startup parameters based on a predetermined correction mode, and start up the operating system kernel of the data processing device based on the legal startup parameters.

In an implementation, the apparatus further includes:

a file system loading module, configured to enable the operating system kernel of the data processing device to detect a predetermined file in a file system after the operating system kernel of the data processing device is started up, enable the operating system kernel of the data processing device to load the file system in response to the operating system kernel of the data processing device detects the predetermined file in the file system, and enable the operating system kernel of the data processing device not to load the file system in response to the operating system kernel of the data processing device does not detect the predetermined file in the file system.

In an implementation, the file system loading module is configured to enable a virus scanning engine thread deployed in the operating system kernel of the data processing device to detect a virus database deployed in the file system.

In an implementation, the apparatus further includes:

a verifying module, configured to enable the virus scanning engine thread to verify the virus database upon detecting the virus database deployed in the file system, and enable the virus scanning engine thread to prohibit the running of a data processing program in response to the virus database is found to be tampered with.

An apparatus for preventing rollback of firmware of a data processing device, including:

a memory; and a processor, wherein the memory stores application programs which are executable on the processor and are configured to enable the processor to implement the method for preventing rollback of the firmware of the data processing device as described in any one of the above.

A data processing device, including:

a calculation board; and a control board, including: a memory and a processor, wherein the memory stores application programs which are executable on the processor and are configured to enable the processor to implement the method for preventing rollback of the firmware of the data processing device as described in any one of the above, wherein the calculation board is in a signal connection with the control board via a signal connection interface, and the calculation board is in an electrical connection with a power supply via a power supply connection interface.

A computer-readable storage medium, storing computer-readable instructions which are configured to implement the method for preventing rollback of the firmware of the data processing device as described in any one of the above.

It can be seen from the above technical solutions that, in the implementations of the present application, the boot loader reads the current value of the predetermined bit in the one-time programmable memory, and determines whether the current value and the legal value written into the one-time programmable memory after the latest upgrading of the firmware of the data processing device satisfy the preset relationship; and in response to it is determined that the current value and the legal value satisfy the preset relationship, the boot loader is enabled to call the operating system kernel of the data processing device, and in response to it is determined that the current value and the legal value do not satisfy the preset relationship, the boot loader is enabled not to call the operating system kernel of the data processing device. It can be seen that according to the implementations of the present application, the updated firmware can effectively prevent rollback of the firmware of the data processing device by modifying the value of the predetermined bit in the one-time programmable memory.

Moreover, according to the implementations of the present application, the illegal startup parameters are transmitted to the operating system kernel of the data processing device, an old version of the operating system kernel of the data processing device cannot be started up normally because the illegal startup parameters cannot be corrected, which can further prevent rollback of the firmware of the data processing device.

In addition, according to the implementations of the present application, the operating system kernel of the data processing device can detect whether a specific file exists in the file system, to further prevents rollback of the firmware of the data processing device.

It can be seen that according to the implementations of the present application, rollback of the firmware of the data processing device can be prevented based on a variety of anti-rollback mechanisms in a link-by-link mode.

DETAILED DESCRIPTION OF EMBODIMENTS

To make the objectives, technical solutions and advantages of the present application clearer, the present application will be further described in detail below with reference to the drawings.

For simplicity and clarity of the description, the solutions of the present application are set forth below by describing several representative embodiments. A large number of details in the implementations are only used to help understand the solutions of the present application. However, it will be apparent that the implementations of the technical solutions of the present application may not be limited to these details. In an effort to avoid unnecessarily obscuring the solutions of the present application, some implementations are not described in detail, but only a structure is given. Hereinafter, "include" means "include but not limited to", and "according to . . . " means "at least according to . . . , but not limited to only according to . . . ". Due to Chinese language conventions, in response to the quantity of a component is not specified below, it means that the component can be one or more, or it can be understood as at least one.

The applicant found that with the increase in sales of mining machines, cracked old versions of firmware of the mining machines have gradually appeared on the market. For example, it is possible to add programs to the firmware that can increase the profit of the mining machines in the short term but will affect the service life of the mining machines in the long term. Some users, under the driving of short-term benefits, will revert to the old versions of the firmware of the mining machines, causing the mining machines to be damaged during the warranty period, thereby seriously damaging the interests of mining machine manufacturers. In addition, mining with the cracked firmware of the mining machines will also cause hidden dangers to the security of digital currency transactions.

The present application proposes a technical solution for preventing rollback of firmware of a data processing device, which can prevent rollback of the firmware of the data processing device based on a variety of ways in a link-by-link mode, and especially prevent rollback of firmware of a digital currency mining machine.

Figure 1:
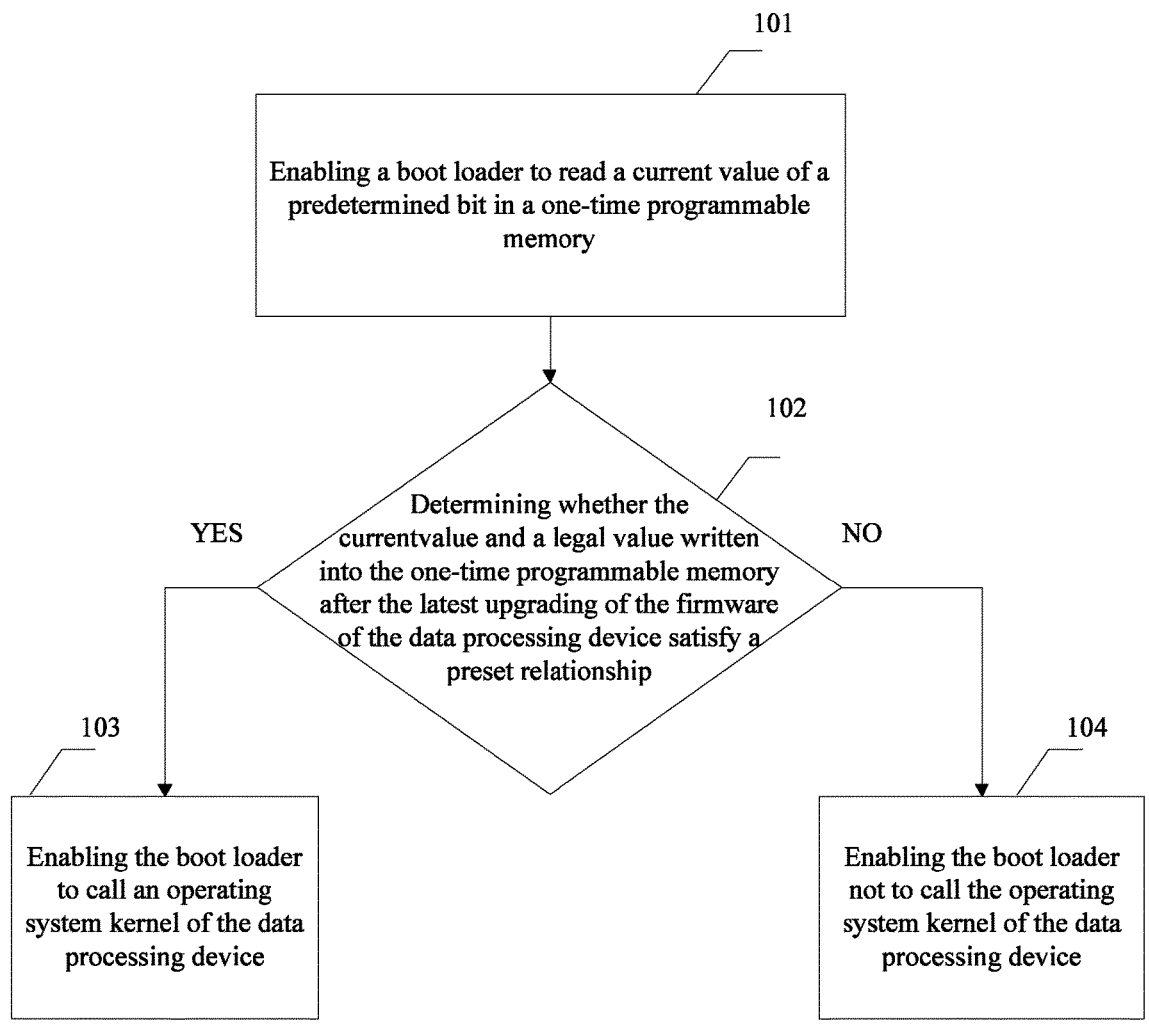
FIG. 1 is an exemplary flowchart of a method for preventing rollback of firmware of a data processing device according to an embodiment of the present application.

FIG. 1 is an exemplary flowchart of a method for preventing rollback of firmware of a data processing device according to an embodiment of the present application. The method is applicable to a digital currency mining machine (mining machine for short) with firmware updated to a new version (for example, the latest version at present)

As shown in FIG. 1, the method includes the following steps:

Step 101: a boot loader (BootLoader) is enabled to read a current value of a predetermined bit in a one-time programmable memory (for example, eFuse).

Take the data processing device being a mining machine as an example. System firmware of the mining machine usually includes: (1) a boot loader such as uboot; (2) an operating system kernel (kernel); and (3) a file system (filesystem). Complete firmware including the three parts is usually referred to as a system image. When the mining machine is powered on, the boot loader, which can be specifically implemented as uboot, is first started up. Then, the boot loader reads a current value of a predetermined bit in an eFuse. The eFuse is located inside a system chip (System On Chip (SOC)). The eFuse is a non-volatile memory inside the SOC, each bit in the eFuse can only be written from 0 to 1, and can only be written once. Moreover, a specific position of the predetermined bit in the eFuse, for example, can be pre-designated by a mining machine manufacturer.

Step 102: whether the current value and a legal value written into the one-time programmable memory after the latest upgrading of the firmware of the data processing device satisfy a preset relationship is determined; when the preset relationship is satisfied, step 103 is performed, and when the preset relationship is not satisfied, step 104 is performed. The preset relationship is that the current value is equal to the legal value, or the current value and the legal value have another preset computational relationship.

Herein, the legal value written into the eFuse after the updating of the firmware of the data processing device, for example, is a predetermined value written into the eFuse after the latest updating of the firmware (for example, is updated to the latest version at present). For example, the specific size of the predetermined value can be predetermined by the mining machine manufacturer and is invisible to mining machine users.

According to an embodiment of the present application, the legal value written into the eFuse after the updating of the firmware of the data processing device can be written into the eFuse when the first starting up of the boot loader after the firmware is updated to a new version (for example, the latest version at present). After the legal value is written into the one-time programmable memory when the first starting up of the boot loader, a value of the predetermined bit is updated according to the legal value and the preset relationship.

In an implementation of the present application, the boot loader can read a value from or write a value into the eFuse by mapping a register.

Step 103: the boot loader is enabled to call an operating system kernel of the data processing device and quit the present process.

Herein, in response to it is determined that the current value and the legal value satisfy the preset relationship at step 102, the boot loader calls the operating system kernel of the data processing device so as to ensure the new version of the firmware can be started up normally.

Step 104: the boot loader is enabled not to call the operating system kernel of the data processing device.

Herein, in response to it is determined that the current value and the legal value do not satisfy the preset relationship at step 102, the boot loader does not call the operating system kernel of the data processing device so as to stop startup of the old version of the firmware.

The flow shown in FIG. 1 will be described in detail below by examples.

It is assumed that there is an old version of mining machine firmware A. During the normal startup process of a mining machine installed with the mining machine firmware A, a boot loader in the mining machine firmware A reads a value of a predetermined bit in an eFuse, and then whether the value is equal to a legal value (for example, 0x01) in the mining machine firmware A is determined, wherein the firmware cannot be started up normally if the value is not equal to the legal value, and the firmware can be started up normally if the value is equal to the legal value. If the mining machine firmware A is a first version of the mining machine firmware on the mining machine, the value and legal value of the predetermined bit in the eFuse can be preset when a mining machine chip leaves a factory, for example, is preset to be 0x01 mentioned above.

After the mining machine firmware A is updated to a new version of mining machine firmware B, during the normal startup process of the mining machine installed with the updated mining machine firmware B, a boot loader in the mining machine firmware B reads the value of the predetermined bit in the eFuse, and it is found that the value of the predetermined bit is equal to the legal value (i.e. 0x01) in the mining machine firmware A. Then, the boot loader in the mining machine firmware B modifies the value of the predetermined bit to be equal to a legal value (for example, 0x03) in the mining machine firmware B, or modifies the value of the predetermined bit according to a preset relationship and the legal value, and the firmware is started up normally. In the subsequent process of starting up the mining machine, the boot loader reads the value of the predetermined bit in the eFuse, if it is found that the value of the predetermined bit is equal to the legal value (i.e. 0x03) in the mining machine firmware B, or they satisfy the preset relationship, the mining machine is started up normally, and if it is found that the value of the predetermined bit is not equal to the legal value in the mining machine firmware B, or they do not satisfy the preset relationship, the mining machine is not started up.

It is assumed that the firmware of the mining machine is rolled back to the mining machine firmware A by flashing (for example, by directly burning a cracked system image of the mining machine firmware A, or rolling back to the mining machine firmware A through a network). During the normal startup process of the mining machine that is rolled back to the mining machine firmware A, the boot loader in the mining machine firmware A reads the value of the predetermined bit in the eFuse, and it is found that the value is 0x03 (because the value is modified to 0x03 when the firmware is updated to the new version of the mining machine firmware B), the mining machine cannot continue to be started up because the boot loader in the mining machine firmware A does not regard 0x03 as the legal value.

It can be seen that the implementation of the present application, by modifying the value of the predetermined bit in the eFuse, can effectively prevent rollback of the firmware of the digital currency mining machine.

During the normal startup process of the firmware, the boot loader will transmit a series of startup parameters to a mining machine operating system kernel, and the mining machine operating system kernel is normally started up based on the startup parameters. Based on the characteristic, the applicant further found that: if the boot loader transmits illegal startup parameters to the mining machine operating system kernel, a new version of the mining machine operating system kernel corrects the illegal startup parameters based on a predetermined mode, and thus the new version of the mining machine operating system kernel can be still started up normally. However, an old version of the mining machine operating system kernel cannot correct the illegal startup parameters, and thus cannot be started up normally. By this way, rollback of the firmware of the digital currency mining machine can be further prevented.

In an implementation, the step that the boot loader calls an operating system kernel of the data processing device includes the following steps: the boot loader transmits illegal startup parameters to the operating system kernel of the data processing device; and the method further includes the following steps: the illegal startup parameters are corrected to legal startup parameters based a predetermined correction mode; and the operating system kernel of the data processing device is started up based on the legal startup parameters.

Example (1): the startup parameters may include a position parameter of an initialization process of a memory image: rdinit.

It is assumed that a correct description of rdinit should be that: rdinit=/init. The boot loader transmits illegal startup parameters different from the correct description to the mining machine operating system kernel, for example, rdinit=/init1. After receiving the illegal startup parameters, the new version of the mining machine operating system kernel corrects "/init1" to "/init" based on a predetermined correction mode so as to restore the illegal startup parameters to legal startup parameters (rdinit=/init), and finds an init program correctly based on the legal startup parameters so as to start up the mining machine operating system kernel successfully. However, after receiving the illegal startup parameters, due to the lack of the correction mode, the old version of the mining machine operating system kernel cannot find the init program correctly, and thus the mining machine operating system kernel cannot be started up.

Example (2): the startup parameters may include a parameter used in an SMP (Symmetrical Multi-Processing) balanced scheduling algorithm for isolating one or more CPUs: isolcpus.

It is assumed that a correct description of isolcpus is that: isolcpus=1, 2, 3. The boot loader transmits illegal startup parameters to the mining machine operating system kernel, for example, isolcpus=0, 1, 2, 3. After receiving the illegal startup parameters, the new version of the mining machine operating system kernel corrects "0, 1, 2, 3" to "1, 2, 3" based on a predetermined correction mode so as to restore the illegal startup parameters to legal startup parameters (isolcpus=1, 2, 3), and isolates CPU1, CPU2, and CPU3 based on the legal startup parameters, and thus CPU0 handles system chores, thereby starting up the mining machine operating system kernel successfully. However, after the old version of the mining machine operating system kernel receives the illegal startup parameters, due to the lack of the correction mode, CPU0, CPU1, CPU2, and CPU3 are all isolated and do not participate in scheduling the operating system, and thus the mining machine operating system kernel cannot be started up.

Typical examples of the startup parameters are exemplarily described above, but the description is only exemplary and is not intended to limit the scope of protection of the implementations of the present application.

The applicant further found that: the mining machine operating system kernel can also detect whether a specific file exists in a file system, to further prevents rollback of the firmware.

In an implementation, after the operating system kernel of the data processing device is started up, the method further includes: the operating system kernel of the data processing device is enabled to detect a predetermined file in a file system; in response to the operating system kernel of the data processing device detects the predetermined file in the file system, the operating system kernel of the data processing device is enabled to load the file system; and in response to the operating system kernel of the data processing device does not detect the predetermined file in the file system, the operating system kernel of the data processing device is enabled not to load the file system. According to the embodiment of the present application, the file system is further encrypted (for example, the file system is encrypted by LUKS (Linux Unified Key Setup)), and the operating system kernel of the data processing device correctly decrypts the file system and then detects the predetermined file.

According to an embodiment of the present application, the operating system kernel of the data processing device detects a predetermined file in a file system includes: a virus scanning engine thread deployed in the operating system kernel of the data processing device detect a virus database deployed in the file system. For example, a virus scanning engine thread deployed in the mining machine operating system kernel detects the virus database deployed in the file system. When the virus scanning engine thread in the mining machine operating system kernel does not detect the virus database in the file system, the mining machine operating system kernel identifies that the file system is illegal (for example, the version is outdated), and thus the file system is not started up, thereby preventing undesirable rollback of the firmware version.

It can be seen that according to the implementation of the present application, not only a virus scanning function is further realized in the mining machine, but also can take the existence of the virus library as the judgment basis for the legitimacy of the file system, so as to further prevent undesired startup of the file system with too old version.

In addition, according to the implementation of the present application, the virus database is deployed in a user space, to facilitate the updating and maintenance of the virus database. Moreover, the virus scanning engine thread is independent of the virus database, and thus the two can be upgraded separately.

In an implementation, the method further includes: the virus scanning engine thread is enabled to scan the data processing device by using the virus database to obtain a scanning result; and the virus scanning engine thread is enabled to perform predetermined processing corresponding to the scanning result. Specifically, the predetermined processing at least includes:

(1) in response to it is determined that the data processing device is abnormal based on the scanning result, an alarm is given;

(2) in response to it is determined that the data processing device is abnormal based on the scanning result, the running of a data processing program is prohibited, wherein according to the embodiment of the present application, the data processing program is a mining program;

(3) in response to it is determined that the data processing device has a virus based on the scanning result, the virus is deleted;

(4) in response to it is determined that the data processing device has a virus based on the scanning result, the running of the virus is stopped; and (5) in response to the scanning result indicates that the data processing device has a virus, the running of the data processing program is prohibited.

Typical examples of the predetermined processing corresponding to the scanning result are exemplarily described above, but those skilled in the art may realize that the description is only exemplary and is not intended to limit the scope of protection of the implementations of the present application.

In an implementation, upon detecting the virus database deployed in the file system, the method further includes: the virus scanning engine thread is enabled to verify the virus database; and in response to the virus database is found to be tampered with, the virus scanning engine thread is enabled to prohibit the running of a data processing program.

Specifically, the virus scanning engine thread can call a function library in a kernel space to verify the virus database. For example, the virus scanning engine thread resolves a signature file from the virus database, and call a decryption function in the function library to decrypt the signature file, and then verify whether the signature file is legal, when the signature file is legal, it is determined that the virus database passes the verification. When the signature is illegal, it is determined that the virus database does not pass the verification (is tampered with illegally), and when the virus database is found to be tampered with, the virus scanning engine thread prohibits the running of the data processing program, thereby ensuring the security of the data processing work.

Therefore, the virus scanning engine thread prohibits the running of the data processing program in response to finding that the virus database is tampered with, to further improves the security of the data processing device.

According to an embodiment of the present application, the virus database may include multiple types of files, and thus the virus scanning engine thread can perform various types of scanning on the data processing device by using the virus database and perform subsequent processing.

Example (1): the virus database includes a program white list; and the step that the virus scanning engine thread scans the digital currency mining machine by using the virus database includes the following steps: scan, by the virus scanning engine thread, an on-line running program in the user space, and determines that the on-line running program is a virus in response to determining that the on-line running program does not belong to the program white list. After the on-line running program is determined as a virus, the running of the on-line running program can be stopped, and the on-line running program is deleted.

Example (2): the virus database includes a list of user space files that need to be protected; and the step that the virus scanning engine thread scans the digital currency mining machine by using the virus database includes the following steps: the virus scanning engine thread determines that the digital currency mining machine is abnormal in response to determining that a file in the list of the user space files is tampered with. In response to it is determined that the digital currency mining machine is abnormal, an alarm can be given, and the running of the mining program is prohibited.

Example (3): the virus database includes a known virus characteristic; and the step that the virus scanning engine thread scans the digital currency mining machine by using the virus database includes the following steps: the virus scanning engine thread determines that an on-line running program or off-line running program is a virus in response to scanning the on-line running program or off-line running program including the known virus characteristic in the user space. After the on-line running program or off-line running program is determined as a virus, the running of the on-line running program can be stopped, and the on-line running program or off-line running program is deleted.

Example (4): the virus database includes a protected network interface and a list of authorized access program for the protected network interface; and the step that the virus scanning engine thread scans the digital currency mining machine by using the virus database includes the following steps: the virus scanning engine thread determines that an on-line running program is a virus in response to scanning the on-line running program that accesses the protected network interface and does not belong to the authorized access program in the user space. After the on-line running program is determined as a virus, the running of the on-line running program can be stopped, and the on-line running program is deleted.

Typical examples of various types of scanning of the digital currency mining machine by using the virus database and the subsequent processing are exemplarily described above, but those skilled in the art may realize that the description is only exemplary and is not intended to limit the scope of protection of the implementations of the present application. For example, the virus scanning engine threads can further realize a journal function so as to track an anti-virus status.

Figure 2:
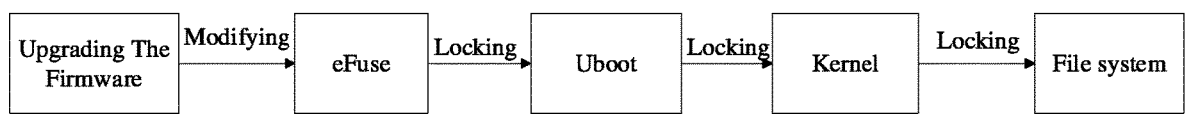
FIG. 2 is an exemplary diagram of flow of preventing rollback of firmware of a data processing device according to an embodiment of the present application.

FIG. 2 is an exemplary diagram of flow of preventing rollback of firmware of a data processing device according to an embodiment of the present application.

In FIG. 2, first, the firmware of the digital currency mining machine is updated, wherein the updating of the firmware may be realized by burning images with an SD card, or upgrading system with a network update package. The firmware includes: (1) a uboot; (2) a kernel, and (3) a file system. After upgrading, the uboot, the kernel, and the file system are all updated from old versions to new versions.

When the system is powered on and started up initially after updating, the new version of uboot is started up, and the new version of uboot determines whether a predetermined bit of an eFuse has a legal default, and writes a legal value corresponding to the new version (the value will also be considered legal at the next startup) if the default is legal, wherein the predetermined bit of the eFuse may be read and written by mapping a register. Therefore, by modifying the predetermined bit of the eFuse, the uboot is locked, thereby preventing the startup of the old version of the firmware.

In addition, the new version of uboot transmits illegal startup parameters to the new version of the kernel. The new version of the kernel corrects the illegal startup parameters and is started up normally. Therefore, by transmitting the illegal startup parameters, the kernel is locked, thereby further preventing the startup of the old version of the firmware.

Next, the new version of the kernel decrypts a file system that is encrypted by a LUKS mode, and determines whether a specific file (for example, a virus database) exists in the file system to verify whether the file system is a legal file system. If the file system is legal, the new version of the kernel continues to load and normally run the file system, otherwise terminates the startup. Therefore, by querying the predetermined file, the file system is locked, thereby further preventing the startup of the old version of the firmware.

The above describes the flow of upgrading and normally starting up the firmware. The cases where a third party tries to start up the firmware by using an old version of uboot, an old version of the kernel, and an old version of the file system (for example, the uboot rolled back to an old version, the kernel rolled back to an old version, and the file system rolled back to an old version), respectively, will be described below.

Case I: The Startup Process when the Third Party Uses the Old Version of Uboot:

the old version of uboot is started up, and the old version of uboot reads a value of a predetermined bit of the eFuse inside the SOC. Because a new legal value is written into the predetermined bit by a new version of uboot, the old version of uboot determines that the value is illegal, and then the normal startup fails.

Case II: The Startup Process when the Third Party Uses the New Version of Uboot and the Old Version of the Kernel:

The new version of uboot is started up, and the new version of uboot can read the new legal value of the predetermined bit and transmit illegal startup parameters to the old version of the kernel. However, since the old version of the kernel does not have a process of correcting the startup parameters, normal startup fails.

Case III: The Startup Process when the Third Party Uses the New Version of Uboot, the New Version of the Kernel, and the Old Version of the File System:

The new version of uboot is started up, and the new version of uboot can read the new legal value of the predetermined bit and transmit illegal startup parameters to the new version of the kernel. The new version of the kernel can correct the illegal startup parameters and load the old version of the file system. However, the new version of the kernel cannot find a predetermined file in the old version of the file system, so the normal startup fails.

It can be seen that according to the implementations of the present application, rollback of the firmware can be prevented based on a variety of ways in a link-by-link mode.

Based on the above description, the implementations of the present application further propose an apparatus for preventing rollback of firmware of a data processing device.

Figure 3:
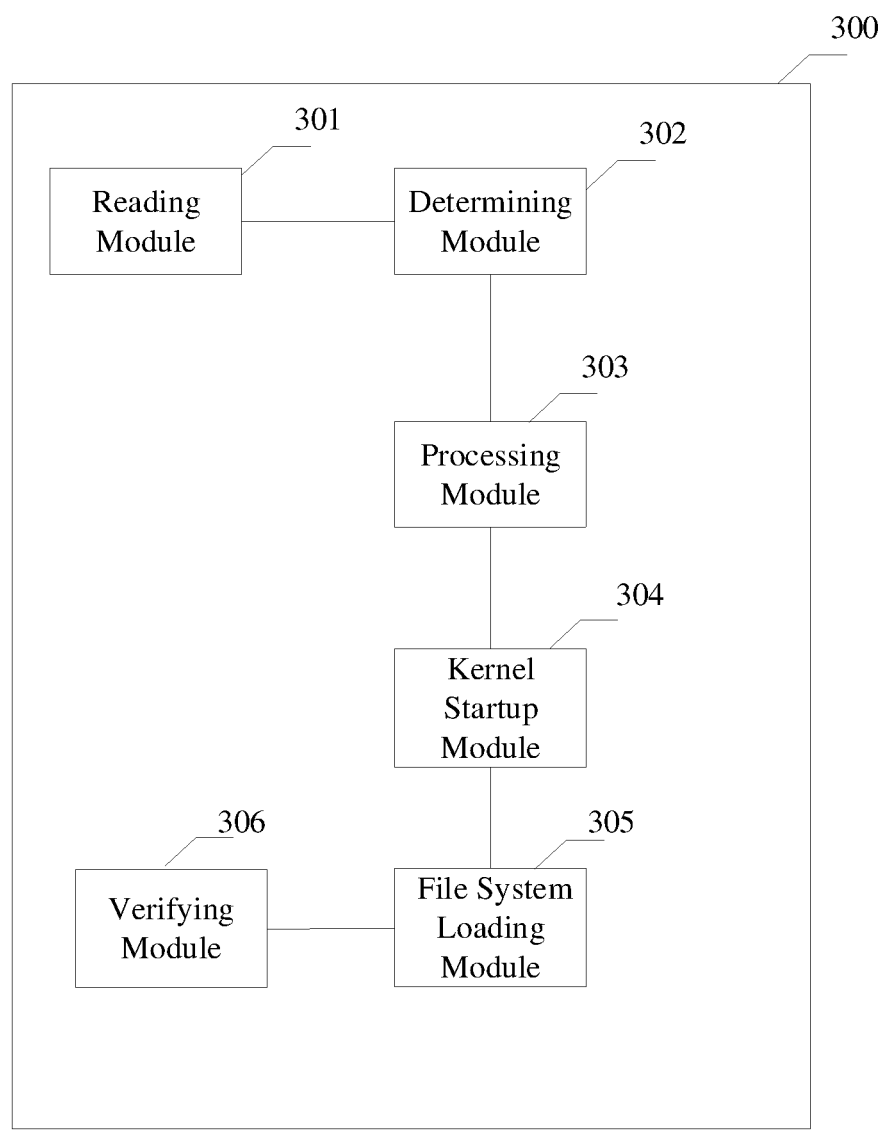
FIG. 3 is an exemplary structural diagram of an apparatus for preventing rollback of firmware of a data processing device according to an embodiment of the present application.

FIG. 3 is an exemplary structural diagram of an apparatus for preventing rollback of firmware of a data processing device according to an embodiment of the present application.

As shown in FIG. 3, the apparatus 300 includes:

a reading module 301, configured to enable a boot loader to read a current value of a predetermined bit in a one-time programmable memory;

a determining module 302, configured to determine whether the current value and a legal value written into the one-time programmable memory after the latest upgrading of the firmware of the data processing device satisfy a preset relationship; and a processing module 303, configured to enable the boot loader to call an operating system kernel of the data processing device in response to it is determined that the current value and the legal value satisfy the preset relationship, and enable the boot loader not to call the operating system kernel of the data processing device in response to it is determined that the current value and the legal value do not satisfy the preset relationship.

In an implementation, the processing module 303 is configured to enable the boot loader to transmit illegal startup parameters to the operating system kernel of the data processing device; and the apparatus 300 further includes:

a kernel startup module 304, configured to correct the illegal startup parameters to legal startup parameters based on a predetermined correction mode, and start up the operating system kernel of the data processing device based on the legal startup parameters.

In an implementation, the apparatus 300 further includes:

a file system loading module 305, configured to enable the operating system kernel of the data operating device to detect a predetermined file in a file system after the operating system kernel of the data processing device is started up, enable the operating system kernel of the data processing device to load the file system in response to the operating system kernel of the data processing device detects the predetermined file in the file system, and enable the operating system kernel of the data processing device not to load the file system in response to the operating system kernel of the data processing device does not detect the determined file in the file system.

In an implementation, the file system loading module 305 is configured to enable a virus scanning engine thread deployed in the operating system kernel of the data processing device to detect a virus database deployed in the file system.

In an implementation, the apparatus 300 further includes:

a verifying module 306, configured to enable the virus scanning engine thread to verify the virus database upon detecting the virus database deployed in the file system, and enable the virus scanning engine thread to prohibit the running of a mining program in response to the virus database is found to be tampered with.

Specific functions of various modules of the above apparatus 300 can refer to the description of the method for preventing rollback of the firmware of the data processing device according to the above embodiments.

The implementations of the present application further propose an apparatus with a memory-processor structure for preventing rollback of firmware of a data processing device.

Figure 4:
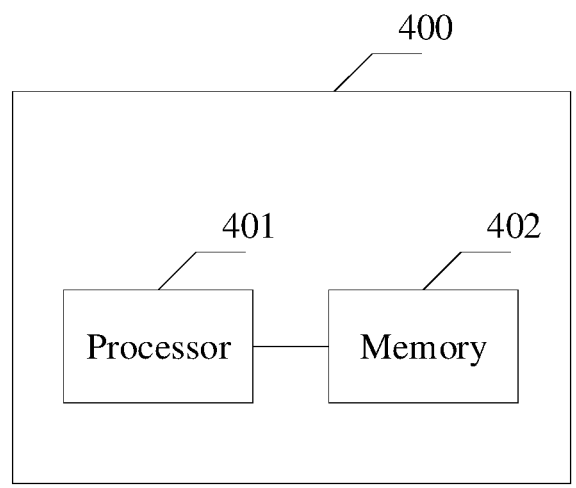
FIG. 4 is an exemplary structural diagram of an apparatus with a memory-processor structure for preventing rollback of firmware of a data processing device according to an embodiment of the present application.

FIG. 4 is an exemplary structural diagram of an apparatus with a memory-processor structure for preventing rollback of firmware of a data processing device.

As shown in FIG. 4, the apparatus 400 for preventing rollback of the firmware of the data processing device includes:

a processor 401 and a memory 402, wherein the memory 402 stores application programs which are executable on the processor 401 and are configured to enable the processor 401 to implement the method for preventing rollback of the firmware of the data processing device according to the above embodiments.

The memory 402 may be specifically implemented as a variety of storage media such as an electrically erasable programmable read-only memory (EEPROM), a flash memory, and a programmable read-only memory (PROM). The processor 401 may be implemented to include one or more central processing units, or one or more field programmable gate arrays, wherein the field programmable gate array integrates one or more central processing unit cores. Specifically, the central processing unit or central processing unit core may be implemented as a CPU, an MCU or a digital signal processor (DSP).

Figure 5:
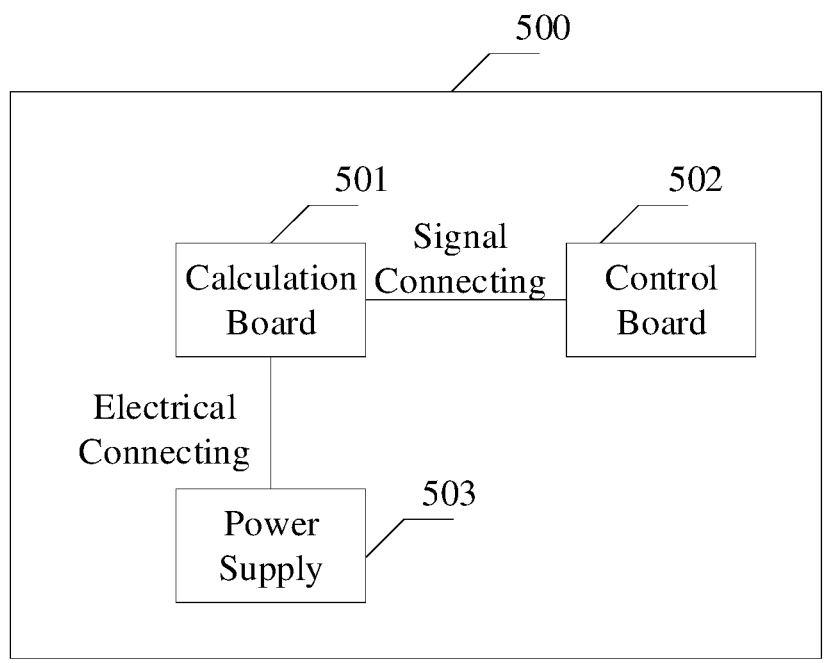
FIG. 5 is an exemplary structural diagram of a data processing device according to an embodiment of the present application.

The implementations of the present application further propose a data processing device. FIG. 5 is an exemplary structural diagram of a data processing device according to an embodiment of the present application.

As shown in FIG. 5, the data processing device 500 includes:

a calculation board 501; and a control board 502, including: a memory and a processor, wherein the memory stores application programs which are executable on the processor and are configured to enable the processor to implement the method for preventing rollback of the firmware of the data processing device according to the above embodiments, the calculation board 501 is in a signal connection with the control board 502 via a signal connection interface, and the calculation board 501 is in an electrical connection with a power supply 503 via a power supply connection interface.

It should be noted that not all steps and blocks in the above flowcharts and structural diagrams are necessary, and some steps or blocks can be omitted as required. An order of execution of various steps is not fixed and can be adjusted as required. The division of various modules is only to facilitate the description of the functional division. In a practical implementation, a module may be implemented by multiple modules, and functions of multiple modules may also be implemented by the same module. These modules may be located in the same device, or may also be located in different devices.

Hardware modules in various implementations may be implemented in a mechanical way or an electronic way. For example, a hardware module may include a specially designed permanent circuit or a logic component (for example, a dedicated processor such as an FPGA or an ASIC) for performing specific operations. The hardware module may also include a programmable logic component or circuit temporarily configured by software (for example, including a general-purpose processor or other programmable processors) for performing specific operations. Whether the hardware module is implemented in the mechanical way, or by the dedicated permanent circuit, or by the temporarily configured circuit (for example, configured by software) can be determined according to cost and time considerations.

The present application further provides a machine-readable storage medium storing instructions for enabling a machine to implement the method according to the present application. Specifically, a system or apparatus equipped with a storage medium may be provided, wherein the storage medium stores software program codes for realizing an function of any implementation in the above embodiments, and a computer (or CPU or MPU) of the system or apparatus is enabled to read and execute the program codes stored in the storage medium. In addition, an operating system operated on the computer can be further enabled to perform part or all of the actual operations based on instructions of the program codes. The program codes read from the storage medium can further be written into a memory provided in an expansion board inserted into the computer or written into a memory provided in an expansion unit connected to the computer, and then a CPU or the like installed on the expansion board or expansion unit is enabled to perform part or all of the actual operations based on the instructions of the program codes, thereby realizing the function of any one of the above implementations. Implementations of the storage medium for providing the program codes include a floppy disc, a hard disc, a magneto optical disk, an optical disc (such as a CD-ROM, a CD-R, a CD-RW, a DVD-ROM, a DVD-RAM, a DVD-RW, and a DVD+RW), a magnetic tape, a non-volatile memory card, and an ROM. Alternatively, the program codes can be downloaded from a server computer or cloud via a communication network.

Herein, "schematic" means "serving as an example, instance, or illustration", and any drawing or implementation described as "schematic" herein should not be construed as a more preferred or technical solution with more advantages. To make the drawings concise, only the relevant parts of the present application are schematically shown in various drawings, but do not represent an actual structure of a product. In addition, in order to make the drawings concise and easy to understand, in some drawings, only one of the components with the same structure or function is schematically shown, or only one of them is marked. Herein, "a/an" does not mean that the number of the relevant parts of the present application is limited to "only one", and "a/an" does not mean to exclude the situation where the number of the relevant parts of the present application is "more than one". Herein, "upper", "lower", "front", "back", "left", "right", "inside", "outside", etc. are only used to indicate the relative positional relationship between the relevant parts, but does not limit the absolute positions of these relevant parts.

The above are only preferred embodiments of the present application, and are not intended to limit the scope of protection of the present application. Any modification, equivalent replacement, improvement, etc. made within the spirit and principle of the present application shall fall within the scope of protection of the present application.

What is claimed is:

1. A method for preventing rollback of firmware of a data processing device, comprising:
enabling a boot loader to read a current value of a predetermined bit in a one-time programmable memory;
determining whether the current value and a legal value written into the one-time programmable memory after the latest upgrading of the firmware of the data processing device satisfy a preset relationship; and
in response to determining that the current value and the legal value satisfy the preset relationship, enabling the boot loader to call an operating system kernel of the data processing device, and in response to determining that the current value and the legal value do not satisfy the preset relationship, enabling the boot loader not to call the operating system kernel of the data processing device;
wherein the calling, by the boot loader, the operating system kernel of the data processing device comprises:
transmitting, by the boot loader, illegal startup parameters to the operating system kernel of the data processing device, wherein the legal startup parameters are boot parameters for booting the operating system kernel normally, and the illegal boot parameter are boot parameters that cannot be used to boot the kernel normally; the method further comprises:
correcting the illegal startup parameters to legal startup parameters based on a predetermined correction mode; and
starting up the operating system kernel of the data processing device based on the legal startup parameters.

2. The method according to claim 1, wherein after the operating system kernel of the data processing device is started up, the method further comprises:
enabling the operating system kernel of the data processing device to detect a predetermined file in a file system;
wherein, in response to the operating system kernel of the data processing device detects the predetermined file in the file system, enabling the operating system kernel of the data processing device to load the file system; in response to the operating system kernel of the data processing device does not detect the predetermined file in the file system, enabling the operating system kernel of the data processing device not to load the file system.

3. The method according to claim 2, wherein the detecting, by the operating system kernel of the data processing device, the predetermined file in the file system comprises:
detecting, by a virus scanning engine thread deployed in the operating system kernel of the data processing device, a virus database deployed in the file system.

4. The method according to claim 3, further comprising:
enabling the virus scanning engine thread to scan the data processing device by using the virus database to obtain a scanning result; and
enabling the virus scanning engine thread to perform predetermined processing corresponding to the scanning result, wherein the predetermined processing comprises at least one of the following:
giving an alarm in response to determining that the data processing device is abnormal based on the scanning result;
prohibiting the running of a data processing program in response to determining that the data processing device is abnormal based on the scanning result;
deleting a virus in response to determining that the data processing device has the virus based on the scanning result;
stopping the running of a virus in response to determining that the data processing device has the virus based on the scanning result; and
prohibiting the running of the data processing program in response to the scanning result indicates that the data processing device has a virus.

5. The method according to claim 3, wherein,
upon detecting the virus database deployed in the file system, the method further comprises:
enabling the virus scanning engine thread to verify the virus database, in response to the virus database is found to be tampered with, enabling the virus scanning engine thread to prohibit the running of a data processing program.

6. The method according to claim 1, wherein the legal value written into the one-time programmable memory after the latest upgrading of the firmware of the data processing device is written into the one-time programmable memory in response to the first starting up of the boot loader after the latest upgrading of the firmware of the data processing device;
the method further comprises: after the legal value is written into the one-time programmable memory, updating a value of the predetermined bit according to the legal value and the preset relationship.

7. An apparatus for preventing rollback of firmware of a data processing device, comprising:
a memory; and
a processor,
wherein the memory stores application programs which are executable on the processor and are configured to enable the processor to implement:
enable a boot loader to read a current value of a predetermined bit in a one-time programmable memory;
determine whether the current value and a legal value written into the one-time programmable memory after the latest upgrading of the firmware of the data processing device satisfy a preset relationship; and
enable the boot loader to call an operating system kernel of the data processing device in response to it is determined that the current value and the legal value satisfy the preset relationship, and enable the boot loader not to call the operating system kernel of the data processing device in response to it is determined that the current value and the legal value do not satisfy the preset relationship;
enable the boot loader to transmit illegal startup parameters to the operating system kernel of the data processing device, wherein the legal startup parameters are boot parameters for booting the operating system kernel normally, and the illegal boot parameter are boot parameters that cannot be used to boot the kernel normally;
correct the illegal startup parameters to legal startup parameters based on a predetermined correction mode, and start up the operating system kernel of the data processing device based on the legal startup parameters.

8. The apparatus according to claim 7, wherein the processor is configured to implement:
enable the operating system kernel of the data processing device to detect a predetermined file in a file system after the operating system kernel of the data processing device is started up, enable the operating system kernel of the data processing device to load the file system in response to the operating system kernel of the data processing device detects the predetermined file in the file system, and enable the operating system kernel of the data processing device not to load the file system in response to the operating system kernel of the data processing device does not detect the predetermined file in the file system.

9. The apparatus according to claim 8, wherein the processor is configured to implement:
enable a virus scanning engine thread deployed in the operating system kernel of the data processing device to detect a virus database deployed in the file system.

10. The apparatus according to claim 9, wherein the processor is configured to implement:
enable the virus scanning engine thread to verify the virus database upon detecting the virus database deployed in the file system, and enable the virus scanning engine thread to prohibit the running of a data processing program in response to the virus database is found to be tampered with.

11. A data processing device, comprising:
a calculation board; and
a control board, comprising: a memory and a processor, wherein the memory stores application programs which are executable on the processor and are configured to enable the processor to implement:
enable a boot loader to read a current value of a predetermined bit in a one-time programmable memory;
determine whether the current value and a legal value written into the one-time programmable memory after the latest upgrading of the firmware of the data processing device satisfy a preset relationship; and
enable the boot loader to call an operating system kernel of the data processing device in response to it is determined that the current value and the legal value satisfy the preset relationship, and enable the boot loader not to call the operating system kernel of the data processing device in response to it is determined that the current value and the legal value do not satisfy the preset relationship;
enable the boot loader to transmit illegal startup parameters to the operating system kernel of the data processing device, wherein the legal startup parameters are boot parameters for booting the operating system kernel normally, and the illegal boot parameter are boot parameters that cannot be used to boot the kernel normally;
correct the illegal startup parameters to legal startup parameters based on a predetermined correction mode, and start up the operating system kernel of the data processing device based on the illegal startup parameters;
wherein the calculation board is in a signal connection with the control board via a signal connection interface, and the calculation board is in an electrical connection with a power supply via a power supply connection interface.

12. A computer-readable storage medium, wherein storing computer-readable instructions which are configured to implement:
enable a boot loader to read a current value of a predetermined bit in a one-time programmable memory;
determine whether the current value and a legal value written into the one-time programmable memory after the latest upgrading of the firmware of the data processing device satisfy a preset relationship; and
in response to determining that the current value and the legal value satisfy the preset relationship, enable the boot loader to call an operating system kernel of the data processing device, and in response to determining that the current value and the legal value do not satisfy the preset relationship, enable the boot loader not to call the operating system kernel of the data processing device;
wherein the calling, by the boot loader, the operating system kernel of the data processing device comprises: transmitting, by the boot loader, illegal startup parameters to the operating system kernel of the data processing device, wherein the legal startup parameters are boot parameters for booting the operating system kernel normally, and the illegal boot parameter are boot parameters that cannot be used to boot the kernel normally;
correct the illegal startup parameters to legal startup parameters based on a predetermined correction mode; and
start up the operating system kernel of the data processing device based on the legal startup parameters.

* * * * *